United States Patent [19]
Popa et al.

[11] Patent Number: 5,955,536
[45] Date of Patent: *Sep. 21, 1999

[54] METHOD FOR TREATING PLASTIC, LEATHER OR RUBBER SUBSTRATES

[75] Inventors: Paul Joseph Popa, Auburn; Linda Denise Kennan, Midland; Thomas Matthew Gentle, Midland; Dale Earl Hauenstein, Midland, all of Mich.

[73] Assignee: Dow Corning Corporation, Midland, Mich.

[ * ] Notice: This patent is subject to a terminal disclaimer.

[21] Appl. No.: 08/474,437

[22] Filed: Jun. 7, 1995

Related U.S. Application Data

[62] Division of application No. 08/317,946, Oct. 4, 1994, Pat. No. 5,514,419.

[51] Int. Cl.$^6$ ............................... C08L 83/04; C14C 9/00
[52] U.S. Cl. .................... 524/837; 524/269; 524/506; 524/804; 524/860; 252/8.57; 252/400.31
[58] Field of Search .................... 524/860, 269, 524/837, 804, 506; 252/321, 358, 8.57, 400.31; 528/27

[56] References Cited

U.S. PATENT DOCUMENTS

| | | | |
|---|---|---|---|
| 2,356,367 | 8/1944 | Wright | 252/29 |
| 2,375,007 | 5/1945 | Larsen | 252/48 |
| 2,398,187 | 4/1946 | McGregor | 252/78 |
| 2,466,642 | 4/1949 | Larsen | 252/29 |
| 2,773,034 | 12/1956 | Bartleson | 252/32.7 |
| 3,328,482 | 6/1967 | Northrup et al. | 260/825 |
| 3,620,778 | 11/1971 | Morrell | 106/35 |
| 3,697,440 | 10/1972 | Lichtman | 252/321 |
| 3,816,313 | 6/1974 | Szieleit | 252/49.6 |
| 3,956,174 | 5/1976 | Palcher | 252/400 |
| 3,959,175 | 5/1976 | Smith, Jr. | 252/321 |
| 4,059,534 | 11/1977 | Morro et al. | 252/32.7 |
| 4,097,393 | 6/1978 | Cupper et al. | 252/78.3 |
| 4,514,319 | 4/1985 | Kulkarni | 252/321 |
| 4,880,318 | 11/1989 | Shibahara | 384/125 |
| 5,442,010 | 8/1995 | Hauerstein et al. | 524/588 |

FOREIGN PATENT DOCUMENTS

| | | | |
|---|---|---|---|
| 1100931 | 10/1978 | Canada | 253/64 |
| 529161 | 3/1997 | European Pat. Off. | |
| 1490240 | 12/1973 | Germany | |
| 63-199277 | 8/1988 | Japan | |

OTHER PUBLICATIONS

Oppanol B Range Product Literature.
Polymer Blends, by Sonja Krause, vol. I, (1978), p. 86.
The Miscibility of Polymers: I. Phase Equilibria in Systems Containing Two Polymers and a Mutual Solvent, by Allen, Gee and Nicholson, (1959), pp. 56–62.
The Miscibility of Polymers: II. Miscibility and Heat of Mixing of Liquid Polyisobutenes and Silicones, by Allen, Gee and Nicholson, (1960). pp. 8–17.
Synthetic Lubricants and High–Performance Functional Fluids, Marcel Dekker, Inc., (1993) p. 279.
The Panalane Advantage, Amoco, (1992), pp. 2–8.
Macromolecules, vol. 8, No. 3, May–Jun. 1975, pp. 371–373.

*Primary Examiner*—Ralph H. Dean
*Attorney, Agent, or Firm*—Alexander Weitz

[57] ABSTRACT

There is disclosed a method for treating and protecting a substrate, said method comprising coating the surface of said substrate with a composition comprising a blend of (A) a polydimethylsiloxane polymer having a viscosity at 25° C. of 5 to 100,000 cS; and (B) a polyisobutylene oligomer having a number average molecular weight of 200 to 550. The treatment imparts an aesthetically pleasing appearance to the surfaces of plastic, rubber or leather substrates whereby surface gloss is enhanced, but not excessively, as is the case for a comparable all-silicone treating agent.

9 Claims, No Drawings

METHOD FOR TREATING PLASTIC, LEATHER OR RUBBER SUBSTRATES

This is a divisional of application Ser. No. 08/317,946, now U.S. Pat. No. 5,514,419, filed on Oct. 4, 1994.

FIELD OF THE INVENTION

The present invention relates to a method for treating plastic, leather or rubber substrates. More specifically, the invention relates to a method for treating the substrates with a composition comprising a polyisobutylene (PIB) oligomer and a polydimethylsiloxane (PDMS) fluid.

BACKGROUND OF THE INVENTION

Synthetic leathers based on poly (vinyl chloride) resins (PVC), and polymer alloys thereof, are extensively used in the automotive and furniture markets due to their low cost and durability (resistance to ozone, ultraviolet radiation, and burning) relative to natural leathers. Protective treatments have been developed for the purpose of cleaning, preserving, and conditioning the surfaces of these PVC products, as well as those fabricated from various organic rubbers and natural leathers. Specifically, polydimethylsiloxane oils have been used as treating agents for plastics and rubbers. Such treatments impart improved gloss, restore the appearance, and protect the surfaces against grease, dirt, water, UV radiation, thermal degradation and ozone. Thus, for example, U.S. Pat. No. 3,956,174 to Palcher discloses a process for protecting, preserving and renewing surfaces, such as rubber or polymer surfaces, the process comprising applying an emulsion of a polydimethylsiloxane fluid to the surface, allowing the fluid to penetrate the surface for a given time and then reiterating the application at least one more time. Preferred treating emulsions according to this patent include a polyol compound, such as diethylene glycol or glycerin.

Unfortunately, treatment with silicone compositions typically also has an undesirable side effect. These materials impart a "greasy" feel to the treated substrate. This greasiness is believed to be due to residual material which does not penetrate the surface and can subsequently attract dirt or dust.

Another problem associated with the typical silicone formulations Is the high gloss imparted to the treated surface. This is especially problematic in current model automobiles and minivans which have large dashboards and windscreens. Excessive gloss of the treated surfaces can result in hazardous driving conditions due to the associated glare. This is especially the case during daylight hours when bright sunlight reflects off the treated dashboard, resulting in visual "washout" or temporary "blinding" of the driver. Although the glare issue in these critical automotive applications has been addressed by making use of plastic materials having lower gloss or matte finishes, these materials still require some aftermarket care in order to protect the original finish and restore toe appearance of aged components. On the other hand, a slight enhancement of gloss is desired since this provides an immediate visual indication of the applied treatment for the consumer. Thus, a successful treating composition must have a delicate balance of gloss augmentation.

SUMMARY OF THE INVENTION

The present invention overcomes the above mentioned disadvantages and provides a treating composition, and method of use therefor, which imparts an aesthetically pleasing appearance to the surfaces of plastic, rubber or leather substrates. The gloss of the treated substrate is enhanced, but not excessively, as is the case for a comparable all-silicone treating agent. Further, substrates treated with the instant compositions have a significantly reduced degree of greasiness relative to those treated with a typical silicone oil. Moreover, the treatment compositions of the invention provide improved protection against the above mentioned environmental factors, particularly thermal degradation of a plastic (e.g., due to the loss of plasticizer which occurs when an automobile is exposed to direct sunlight).

The present invention, therefore, relates to a blend of
(A) a polydimethylsiloxane polymer having a viscosity at 25° C. of about 5 to about 100,000 cS; and
(B) a polyisobutylene oligomer having a number average molecular weight of about 200 to about 550, wherein the weight ratio of said polydimethylsiloxane (A) to said polyisobutylene (B) is 99:1 to 30:70.

The invention further relates to a method for treating and protecting a substrate selected from the group consisting of plastic, leather and organic (i.e., non-silicone) rubber comprising coating the surface of said substrate with the above blend.

The invention also relates to the treated substrate, prepared according to the above method.

DETAILED DESCRIPTION OF THE INVENTION

The polydimethylsiloxane (A) of the invention is a homopolymer or copolymer having a viscosity at 25° C. which is in the range of about 5 to about 100,000 cS (5 to 100,000 mm$^2$/s) wherein up to about 35 mole percent, preferably less than 10 mole percent, of diorganosiloxane units may be copolymerized with the dimethylsiloxane units. When the viscosity is greater than about 100,000 cS the penetration of the silicone fluids into the substrate to be protected is poor. When the viscosity is less than about 5 cS the degree of protection provided is inadequate because this component becomes too volatile. Preferably, the viscosity of component (A) is about 100 to 1,000 cS at 25° C., most preferably about 300 to 400 cS.

The organic groups of the above mentioned dicrganopolysiloxane units are independently selected from alkyl radicals having 1 to 16 carbon atoms, halogenated alkyl radicals having 3 to 6 carbon atoms, aryl radicals such as phenyl, aralkyl radicals, cycloaliphatic radicals or alkylene oxide groups, such as ethylene oxide, propylene oxide or copolymeric combinations thereof.

The nature of the terminal groups on the polydimethylsiloxane component (A) is not critical for the purposes of the present invention and these may be inert groups, such as trimethylsiloxy, dimethylphenylsiloxy and diethylphenylsiloxy. They may also be illustrated by groups such as dimethylvinylsiloxy, dimethylhexenylsiloxy, dimethylhydroxysiloxy, dimethylhydrogensiloxy, dimethylalkoxysiloxy, methyldialkoxysiloxy and trialkoxysiloxy, wherein the alkoxy groups are preferably methoxy. Most preferably, component (A) is a polydimethylsiloxane homopolymer having trimethylsiloxy terminal units.

Component (A) is well known in the art and is generally available commercially.

Component (B) of the invention is a polyisobutylene oligomer having a number average molecular weight (MW) of about 200 to about 550, preferably about 300 to about 550, and most preferably from about 320 to about 450. It has been found that when the molecular weight is greater than about 550, the compositions result in a film which is sticky and tacky and this, in turn, leads to excessive dirt pick-up by the treated substrate. Such oligomers are known in the art and many are available commercially in a variety of molecular weights and end group combinations. The polyisobutylene oligomer may have fully saturated end groups or it may have at least one terminal group which contain a functional group such as epoxy, methylpropenyl, halide, alkoxyphenylene, hydroxyl, carboxyl, chlorosilyl, vinyl, succinic anhydride, isocyanato, amino or amido. Preferred PIB oligomer has either two fully saturated end groups or has one epoxy end group and one saturated end group. Again, the specific polymers and oligomers described above can be prepared by methods known in the art.

In order to prepare the compositions of the present invention, above described components are thoroughly mixed such that the weight ratio of (A) to (B) is about 99:1 to 30:70. Preferably this ratio is about 90:10 to about 40:60 and most preferably about 75:25 to about 50:50. These blends are then applied to the aforementioned substrates according to the method of the present invention, described infra.

The compositions of the invention may be applied in the form of an aqueous emulsion, as a solution in an organic or siloxane-based solvent or as a neat blend without further dilution. Application of the neat blend is not preferred since it can result in excessive deposition of the composition. It is, however, a viable technique when the viscosity of the composition is relatively low, such as below about 500 cS. An excess deposition on the substrate can overcome the benefits of reduced but acceptable gloss, not to mention the obviously undesirable waste of material.

Compositions of the invention can also be applied from a solution of the PDMS/PIB blend in a volatile carrier, such as a hydrocarbon having from about 6 to 16 carbon atoms in its molecule. The hydrocarbon may be a straight or branched chain compound such as heptane, decane, tetradecane and hexadecane. However, due to current volatile organic compound (VOC) regulations, this is not a preferred delivery system.

Alternatively, low molecular weight linear polysiloxanes having a viscosity below about 5 cS at 25° C. can be used as a solvent. Illustrative solvents are linear diorganopolysiloxanes having a degree of polymerization of 2 to about 9. Cyclic diorganopolysiloxanes having a viscosity below about 10 cS at 25° C. are also suitable. Illustrative are cyclics having a degree of polymerization of 4 to about 6, wherein the organic groups are independently selected from alkyl radicals having 1 to 6 carbon atoms. Specific examples of the above siloxanes include hexamethyldisiloxane, octamethylcyclotetrasiloxane and decamethylcyclopentasiloxane. Mixtures of these siloxanes may also be employed.

Preferably, the compositions of the present invention are applied from an aqueous emulsion. In this case, the polydimethylsiloxane and polyisobutylene fluids are preferably premixed and then emulsified. Alternatively, each fluid can be emulsified independently and the resulting emulsions mixed. These emulsions are prepared with the aid of at least one non-ionic surfactant, standard mixing and dispersion techniques being employed. The preferred surfactant is an ethoxylated trimethylnonanol. Chemically, this surfactant is trimethylnonylphenyl poly(ethylene oxide). Other suitable non-ionic surfactants may be selected from modified polyethoxylated alcohols, inter alia. The non-ionic surfactant can be used in combination with an anionic surfactant, such as an sodium alkylaryl ether sulfate, sodium alkylaryl polyether sulfonate, or a blend of an alkylaryl polyether alcohol with an organic sulfonate. The emulsions preferably contain about 1 to about 60 percent of the combined weights of components (A) and (B), most preferably about 20 weight percent, the remainder being water, surfactant and additional minor component, described infra. In this connection, commercial silicone aqueous emulsions are available which contain up to 50% silicone.

In addition to components (A) and (B), the instant compositions may contain a variety of additives which are not essential or critical to performance, but may be advantageous in some applications. These materials include rust inhibitors, dyes, UV absorbers, antifoam agents, antimicrobial agents, and the like. When employed, such additives should comprise no more than about 2 parts by weight for each 100 parts by weight of (A) and (B). When the compositions of the invention are to be applied from an aqueous emulsion, the additives are preferably soluble, or dispersible, in water.

The method of the present invention comprises coating at least a portion of the surface of a plastic, leather or rubber substrate with the above described composition comprising components (A) and (B). The method of coating (or treating) these substrates may be any of those known in the art. Examples of suitable coating methods include wiping, spraying, pouring, brushing, rolling and dipping. Preferably, the composition is sparingly applied to the substrate and distributed over the surface thereof by rubbing with a cloth or paper towel or rag. Alternatively, the composition may be applied to the towel or rag and then rubbed over the surface of the substrate. After such an application, any water or solvent used as a carrier for component (A) and (B) is allowed to evaporate to leave a treated substrate. If desired, this treated surface may further be buffed or polished to enhance the appearance of the final finish. The plastic substrates which benefit from treatment with the instant compositions include polymers and copolymers of vinylic monomers, polyurethanes, acrylics and polyolefins, such as polypropylene and polypropylene/EPDM alloys, inter alia. A preferred utility of the instant method is the treatment of plasticized PVC films, polymeric alloys based on PVC and PVC-coated fabrics found in automotive and furniture applications. Examples of rubbers which can be created with the instant compositions include butyl, urethane and ethylene-propylene diene monomer terpolymers (EPDM), inter alia. Treatment of rubber automobile tires is a preferred utility in this regard. Both natural and synthetic leathers (e.g., polyurethane feather, Naugahyde™) also benefit from treatment with the instant compositions.

EXAMPLES

The following examples are presented to further illustrate the method and compositions of this invention, but are not to be construed as limiting the invention, which is delineated in the appended claims. All parts and percentages in the examples are on a weight basis and all measurements were obtained at about 25° C., unless indicated to the contrary.

The following materials were employed in the examples:
PDMS A=trimethylsiloxy-terminated polydimethylsiloxane having a viscosity of about 350 cS (350 mm$^2$/sec).
PIB A=Actipol™ E-6, described as an epoxy-terminated polyisobutylene having a number average molecular weight of about 365 and a product of the Amoco Chemical Company, Chicago, Ill. This oligomer has one terminal group of the structure

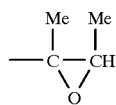

in which Me denotes a methyl radical, the other terminal group being of the formula —C(CH$_3$)$_3$.

PIB B=Polysynlane™, described as a saturated polyisobutylene having a number average molecular weight of about 320 and having one terminal group of the formula

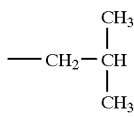

the other terminal group being of the formula —C(CH$_3$)$_3$. It is a product of Polyesther Corporation, Southhampton, N.Y.

PIB C=Indopol™ L-14, described as a vinyl-terminated polyisobutylene having a number average molecular weight of about 320 and a product of the Amoco Chemical Company, Chicago, Ill. One terminal group of this oligomer has the vinyl-like structure (2-methylpropenyl) —HC=C(CH$_3$)$_2$, the other terminal group having the formula —C(CH$_3$)$_3$.

PIB D=Actipol™ E-16, similar to PIB A but having a molecular weight of about 975.

PIB E=Indopol™ H-35, similar to PIB C but having a molecular weight of about 660.

Example 1

The above described PIB and PDMS fluids were premixed in a disposable beaker, using a spatula, in the proportions shown in Table 1. Separately, trimethylnonylphenyl poly(ethylene oxide) surfactant (Tergitol™ TMN-6; Union Carbide, Danbury, Conn.) and deionized water were premixed in a stainless steel beaker using a Cowels blade with medium agitation. Proportions of water and surfactant used are also presented in Table 1. The mixture of PIB and PDMS was then added to the surfactant-water mixture under fast agitation and the agitation was continued for approximately two minutes. The mixture was run through a microfluidizer until a constant particle size was achieved (at least 4 passes).

TABLE 1

| Formulation | PDMS A (g) | PIB Used | PIB (g) | Surfactant (g) | Water (g) |
|---|---|---|---|---|---|
| Control | 40.00 | — | — | 2.2 | 157.8 |
| 1 | 18.75 | A | 6.25 | 1.1 | 78.9 |
| 2 | 20.00 | A | 20.00 | 2.2 | 157.8 |
| 3 | 6.25 | A | 18.75 | 1.1 | 78.9 |
| 4 | 18.75 | B | 6.25 | 1.1 | 78.9 |
| 5 | 55.00 | B | 55.00 | 6.0 | 434.0 |
| 6 | 6.25 | B | 18.75 | 1.1 | 78.9 |
| 7 | 18.75 | C | 6.25 | 1.1 | 78.9 |
| 8 | 20.00 | C | 20.00 | 2.2 | 157.8 |
| 9 | 6.25 | C | 18.75 | 1.1 | 78.9 |

All the emulsions had a non-volatile (NV) polymer content between 20% and about 24%.

Example 2

The formulations of Example 1 were used to treat two different automotive vinyl substrates:

substrate A=a foam-expanded poly (vinyl chloride) (PVC);
substrate B=a PVC/ABS alloy, wherein ABS is an acrylonitrile-butadiene-styrene copolymer.

Samples of Substrate A, measuring 2 inches by 3½ inches, were weighed and each of these was treated with 230 μl of one of the above described formulations or control. The treatment was applied directly to the substrate with a micropipet and the emulsion was wiped in a circular motion over the entire surface with a 3×3 inch cotton cloth. The substrate was allowed to air dry for 2½ hours and re-weighed. In the case of Substrate B, 3×3 inch samples were weighed and treated with 300 μl of the formulations or control, in a similar manner.

An objective indication of surface "greasiness" was then obtained by noting the amount of transfer of applied treatment to a paper tissue, as follows. One half of a Kimwipe™ tissue was weighed and placed on top of a treated substrate, whereupon a 100 gram weight having a diameter of approximately 1.75 inches (4.5 cm) was placed on top or the tissue and allowed to remain in contact therewith. After 30 minutes, the weight was removed and the tissue re-weighed. The weight pick-up and degree of improvement over the control was obtained with the aid of the following equations, the latter measure being presented in Table 2.

$$\% \text{ Wt Pick-up} = 100 \times \frac{(\text{final tissue weight} - \text{initial tissue weight})}{\text{initial tissue weight}}$$

$$\begin{array}{l}\% \text{ Improvement} \\ \text{Relative to} \\ \text{Control}\end{array} = \frac{(\% \text{ Wt pick-up control} - \% \text{ Wt pick-up sample})}{\% \text{ Wt pick-up control}}$$

A % Improvement Relative to Control of greater than 25% was deemed significant since this is considerably greater than experimental error (about 4 to 7%).

TABLE 2

| Form. | Wt of Trmt Substrate A (g) | % Improvement Substrate A | Wt of Trmt Substrate B (g) | % Improvement Substrate B |
|---|---|---|---|---|
| Control | 0.0071 | — | 0.0080 | — |
| 1 | 0.0065 | 66 | 0.0076 | 47 |
| 2 | 0.0073 | 79 | 0.0085 | 58 |
| 3 | 0.0077 | 89 | 0.0074 | 66 |
| 4A | 0.0060 | 55 | 0.0091 | 58 |
| 4B | 0.0078 | 53 | 0.0083 | 58 |
| 5 | 0.0066 | 76 | 0.0071 | 61 |
| 6 | 0.0083 | 100 | 0.0083 | 66 |
| 7 | 0.0075 | 55 | 0.0083 | 53 |
| 8 | 0.0068 | 66 | 0.0085 | 66 |
| 9 | 0.0084 | 100 | 0.0083 | 66 |

All of the formulations of the invention imparted a significant % Improvement over the silicone control, this being an indication of substantivity to the respective substrate.

(Comparative) Example 1

The procedure of Example 1 was followed using Formulations 10 through 12, as described in Table 3a.

TABLE 3a

| Formulation | PDMS A (g) | PIB | PIB (g) | Surfactant (g) | Water (g) |
|---|---|---|---|---|---|
| 10 | — | D | 165.00 | 9.0 | 651.0 |
| 11 | — | E | 165.00 | 9.0 | 651.0 |
| 12 | 18.75 | E | 6.25 | 1.1 | 98.9 |

These formulations had a non-volatile polymer content of 20% and were used to treat Substrate B, as described above. The visual evaluation of these samples, summarized in Table 3b, indicated that PIB having a molecular weight greater than about 550 is not suitable for treating such substrates.

TABLE 3b

| Formulation | Wt of Treatment | Observation |
|---|---|---|
| 10 | 0.0095 g | Sticky, tacky to touch. |
| 11 | 0.0090 g | Sticky; streaked appearance. |
| 12 | 0.0087 | Sticky. |

Example 3

Substrate A and Substrate B were again treated according to the procedures of Example 2. In each case, the sample was weighed before treatment and again after drying in ambient air. The 85 degree gloss (per ASTM D523) was recorded using a portable micro TRI gloss meter (BYK Gardner Inc., Silver Spring, Md.). At least five readings were taken over the surface of the substrate and these averaged. The treated substrates were then heat aged in an oven at 120° C. After three weeks the treated substrates were allowed to cool to room temperature, re-weighed, and the 85 degree gloss was again measured. Tables 4a and 4b show the % gloss retention after heat aging for each formulation and the control. Table 5 shows the % improvement of weight change of each substrate after heat aging relative to the control, wherein the following equations have been utilized:

$$\% \text{ Gloss Retention} = 100 \times (\text{Final Gloss})/(\text{Initial Gloss})$$

$$\% \text{ Wt Change} = 100 \times \frac{(\text{final weight} - \text{initial weight})}{\text{initial weight of substrate}}$$

$$\% \text{ Improvement Relative to Control} = 100 \times \frac{\% \text{ Wt Change control} - \% \text{ Wt Change sample}}{\% \text{ Wt Change control}}$$

TABLE 4a

| | (Substrate A) | | | |
|---|---|---|---|---|
| Formulation | Initial Gloss (%) | Final Gloss (%) | Wt. of Trmt. | % Gloss Retention |
| Control | 6.7 | 4.1 | 0.0081 | 61 |
| 1 | 5.6 | 3.4 | 0.0079 | 61 |
| 2 | 4.9 | 3.6 | 0.0072 | 73 |
| 3 | 3.8 | 3.3 | 0.0075 | 87 |
| 4A | 4.1 | 3.1 | 0.0075 | 76 |
| 4B | 3.9 | 2.7 | 0.0088 | 69 |
| 5 | 3.5 | 3.0 | 0.0086 | 86 |
| 6 | 3.6 | 2.5 | 0.0084 | 69 |
| 7 | 5.3 | 3.4 | 0.0082 | 64 |
| 8 | 4.7 | 3.2 | 0.0075 | 68 |

TABLE 4a-continued

| | (Substrate A) | | | |
|---|---|---|---|---|
| Formulation | Initial Gloss (%) | Final Gloss (%) | Wt. of Trmt. | % Gloss Retention |
| 9 | 3.5 | 2.5 | 0.0079 | 71 |
| Untreated (A) | 2.6 | — | — | — |

TABLE 4b

| | (Substrate B) | | | |
|---|---|---|---|---|
| Formulation | Initial Gloss (%) | Final Gloss (%) | Wt. of Trmt. | % Gloss Retention |
| Control | 9.3 | 6.8 | 0.0089 | 73 |
| 1 | 9.0 | 7.4 | 0.0069 | 82 |
| 2 | 8.6 | 6.8 | 0.0074 | 79 |
| 3 | 8.4 | 6.2 | 0.0082 | 74 |
| 4A | 8.2 | 7.0 | 0.0072 | 85 |
| 4B | 7.9 | 6.3 | 0.0086 | 80 |
| 5 | 8.3 | 6.6 | 0.0070 | 80 |
| 6 | 8.7 | 5.9 | 0.0076 | 68 |
| 7 | 9.1 | 7.5 | 0.0080 | 82 |
| 8 | 8.6 | 6.8 | 0.0076 | 79 |
| 9 | 8.4 | 5.8 | 0.0079 | 69 |
| Untreated (B) | 3.3 | — | — | — |

TABLE 5

| Formulation | % Improvement (Substrate A) | % Improvement (Substrate B) |
|---|---|---|
| Control | — | — |
| 1 | 43 | 41 |
| 2 | 47 | 27 |
| 3 | −25 | 10 |
| 4A | 48 | 34 |
| 4B | 46 | 29 |
| 5 | 52 | 28 |
| 6 | −99 | 10 |
| 7 | 55 | 32 |
| 8 | 45 | 15 |
| 9 | 61 | 2 |

A value of % Improvement in Table 5 of greater than 25% is considered significant and highly desirable with respect to thermal stability of the treatment. Thus, for example, preferred formulations wherein the ratio of PDMS to PIB was at least 1:1, and preferably 3:1, show such improved stability; they are not readily volatilized at elevated temperatures and therefore provide better thermal protection than an all silicone treatment or blends having a PDMS to PIB ratio of less than 1:1.

(Comparative) Example 2

The procedure of Example 1 was followed using Formulations 13 and 14, as described in Table 6a.

TABLE 6a

| Formulation | PDMS A (g) | PIB | PIB (g) | Surfactant (g) | Water (g) |
|---|---|---|---|---|---|
| 13 | — | A | 165.00 | 9.0 | 651.0 |
| 14 | — | C | 165.00 | 9.0 | 651.0 |

These formulations had a non-volatile content of 20% and were used to treat Substrate B, as described above. The evaluation of these samples, summarized in Table 6b, indicated that these low molecular weight PIB components alone do not produce any change in the glossiness of the substrate.

TABLE 6b

| Formulation | Wt of Treatment | 85° Gloss (Initial) |
|---|---|---|
| 13 | 0.0085 g | 3.5 |
| 14 | 0.0090 g | 3.4 |
| Untreated | — | 3.3 |

What which is claimed is:

1. A composition comprising an aqueous emulsion of a blend of
   (A) a polydimethylsiloxane polymer having a viscosity at 25° C. of about 5 to about 100,000 cS; and
   (B) a polyisobutylene oligomer having a number average molecular weight of about 200 to about 550, wherein the weight ratio of said polydimethylsiloxane (A) to said polyisobutylene (B) is 99:1 to 30:70.

2. The aqueous emulsion according to claim 1, wherein said polydimethylsiloxane has a viscosity of 100 to 1,000 cS at 25° C. and said polyisobutylene (B) has a molecular weight of 300 to 550.

3. The aqueous emulsion according to claim 1, wherein one end group of said polyisobutylene is a saturated group and the other end group is selected from the group consisting of a saturated group and an epoxy group.

4. The aqueous emulsion according to claim 1, wherein the weight ratio of polydimethylsiloxane (A) to polyisobutylene (B) is 40:60 to 90:10.

5. The aqueous emulsion according to claim 2, wherein the weight ratio of polydimethylsiloxane (A) to polyisobutylene (B) is 40:60 to 90:10.

6. A composition comprising a blend of
   (A) a polydimethylsiloxane polymer having a viscosity at 25° C. of about 5 to about 100,000 cS; and
   (B) a polyisobutylene oligomer having a number average molecular weight of about 200 to about 550 and having one epoxy end group, wherein the weight ratio of said polydimethylsiloxane (A) to said polyisobutylene (B) is 99:1 to 30:70.

7. The composition according to claim 6, wherein said polydimethylsiloxane has a viscosity of 100 to 1,000 cS at 25° C. and said polyisobutylene (B) has a molecular weight of 300 to 550.

8. The composition according to claim 6, wherein the weight ratio of polydimethylsiloxane (A) to polyisobutylene (B) is 40:60 to 90:10.

9. The composition according to claim 7, wherein the weight ratio of polydimethylsiloxane (A) to polyisobutylene (B) is 40:60 to 90:10.

* * * * *